(12) United States Patent
Mech et al.

(10) Patent No.: US 6,349,113 B1
(45) Date of Patent: Feb. 19, 2002

(54) METHOD FOR DETECTING MOVING CAST SHADOWS OBJECT SEGMENTATION

(75) Inventors: Roland Mech, Hannover; Joern Ostermann, Red Bank; Jurgen Stauder, Gottingen, all of (DE)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/177,686

(22) Filed: Oct. 22, 1998

Related U.S. Application Data (60) Provisional application No. 60/064,107, filed on Nov. 3, 1997.

(51) Int. Cl.[7] ................................................ H04N 7/18
(52) U.S. Cl. ................... 375/240.08; 348/699; 348/700
(58) Field of Search ................................ 382/236, 107, 382/199, 194, 171; 375/240.12, 240.13, 240.14, 240.15, 240.17, 240.16, 240.08

(56) References Cited

U.S. PATENT DOCUMENTS

| | | | |
|---|---|---|---|
| 5,481,628 A | | 1/1996 | Ghaderi ...................... 382/261 |
| 5,557,684 A | * | 9/1996 | Wang et al. ................. 382/107 |
| 5,631,976 A | * | 5/1997 | Bolle et al. .................. 382/171 |
| 5,832,115 A | * | 11/1998 | Rosenberg ................... 382/199 |
| 5,940,538 A | * | 8/1999 | Spiegel et al. ............... 382/236 |
| 6,026,183 A | * | 2/2000 | Talluri et al. ................ 382/194 |
| 6,069,918 A | * | 5/2000 | Meyer et al. ........... 375/240.17 |
| 6,075,875 A | * | 6/2000 | Gu .............................. 382/107 |

OTHER PUBLICATIONS

Marciej Orkisz, "Moving Objects Locations in Complex Scenes Filmed by a Fixed Camera", vol. 9, No. 4, Sep. 1992, pp. 325–346.

Hyung–Il Choi et al., "Motion Interpretation by Analyzing Difference Images", Journal of Systems Architecture, Elsevier Science B.V., Mar. 1, 1997, pp. 307–316.

P. Stelmaszyk et al, "Dynamic Scenes Analysis by Moving Edges Detection", 1985, pp. 1181–1193.

Image Segmentation Based on Object Oriented Mapping Parameter Estimation, Michael Hötter and Robert Thomas, Signal Processing 15 (1988), p. 315–334.

Illumination Independent Change Detection for Real World Image Sequences, K. Skifstad and R. Jain, Computer Vision, Graphics, and Image Processing, pp. 387–399, vol. 46, No. 3, Jun. 1989.

Shadow Segmentation and Classification in a Constrained Environment C. Jiang and M. Ward, Image Understanding, pp. 213–225, vol. 59, No. 2, Mar. 1994.

Image Segmentation Based on Object Oriented Mapping Parameter Estimation, M. Hötter and R. Thoma, Signal Processing, pp. 315–334, vol. 15, No. 3, Oct. 1988.

* cited by examiner

*Primary Examiner*—Andy Rao
(74) *Attorney, Agent, or Firm*—Kenyon & Kenyon (57) ABSTRACT

An image region changed by a moving cast shadow from a first image to a second image is detected. For each pixel within a change detection mask (a binary mask indicating image areas of difference between the first image and the second image) and a set of neighboring pixels, the following steps are performed. Whether the pixel and the set of neighboring pixels include a static background edge or no edge is determined. Whether the pixel and the set of neighboring pixels include an edge with a spatial signal step width greater than a threshold is determined. Whether the pixel and the set of neighboring pixels have a uniform temporal change of illumination is determined. The pixel is classified as being changed by a moving cast shadow when at least two of the above-mentioned determinations succeed for the pixel or when at least one determination from the above-mentions determinations succeed for a majority of the set of neighboring pixels. In another embodiment of the present invention, detected image regions are used to estimate the two-dimensional shape of moving objects in image sequences even in the presence of moving case shadows. In another embodiment, detected image regions are temporarily integrated to represent the total of moving cast shadows.

20 Claims, 8 Drawing Sheets

METHOD FOR DETECTING MOVING CAST SHADOWS OBJECT SEGMENTATION

CROSS-REFERENCES TO RELATED APPLICATION

This application claims the benefit of U.S. Provisional Application No. 60/064,107, filed Nov. 3, 1997, the entire contents of which are incorporated herein by reference.

BACKGROUND OF THE INVENTION

The present invention relates generally to the processing of video image sequences. More specifically, the present invention relates to the detection of moving cast shadows within video image sequences so that object segmentation can be performed.

Shadows occur in a wide variety of scenes, including a wide variety of scenes in sequential video images. If shadows are identified in video images, they can provide a great deal of information about the shape, relative position, and surface characteristics of objects in a scene. Although humans can easily distinguish shadows from objects, identifying shadows by computers is more difficult. For example, identifying shadows by computers involves object segmentation, the separation of an object, its shadow and the background which can have stationary portions and moving portions.

Identifying shadows by computers is even more difficult with cast shadows that are moving from one video image to the next video image. Known methods and systems have been developed to attempt to detect moving cast shadows. For example, one known method performs shadow detection with a static camera providing the image by subdividing an image into blocks and computing the luminance contrast for each block; blocks are identified as moving cast shadows where the luminance contrast changes from pixel to pixel within a block. See Skiftstad, K. and Jain, R., "Illumination Independent Change Detection for Real World Image Sequences," Computer Vision, Graphics, and Image Processing 46, 387–99 (1989).

This known method, however, suffers from shortcomings. Specifically, it cannot distinguish a moving cast shadow from a moving object where the object lacks texture, i.e., lacks sharp contrast within the object.

SUMMARY OF THE INVENTION

An image region changed by a moving cast shadow from a first image to a second image is detected. For each pixel within a change detection mask (a binary mask indicating image areas of difference between the first image and the second image) and a set of neighboring pixels, the following steps are performed. Whether the pixel and the set of neighboring pixels include a static background edge or no edge is determined. Whether the pixel and the set of neighboring pixels include an edge with a spatial signal step width greater than a threshold is determined. Whether the pixel and the set of neighboring pixels have a uniform temporal change of illumination is determined. The pixel is classified as being changed by a moving cast shadow when at least two of the above-mentioned determinations succeed for the pixel or when at least one determination from the above-mentioned determinations succeeds for a majority of the set of neighboring pixels.

In another embodiment of the present invention, detected image regions are used to estimate the two-dimensional shape of moving objects in image sequences even in the presence of moving cast shadows. In another embodiment, detected image regions are temporarily integrated to represent the total of moving cast shadows.

DETAILED DESCRIPTION

Figure 1:
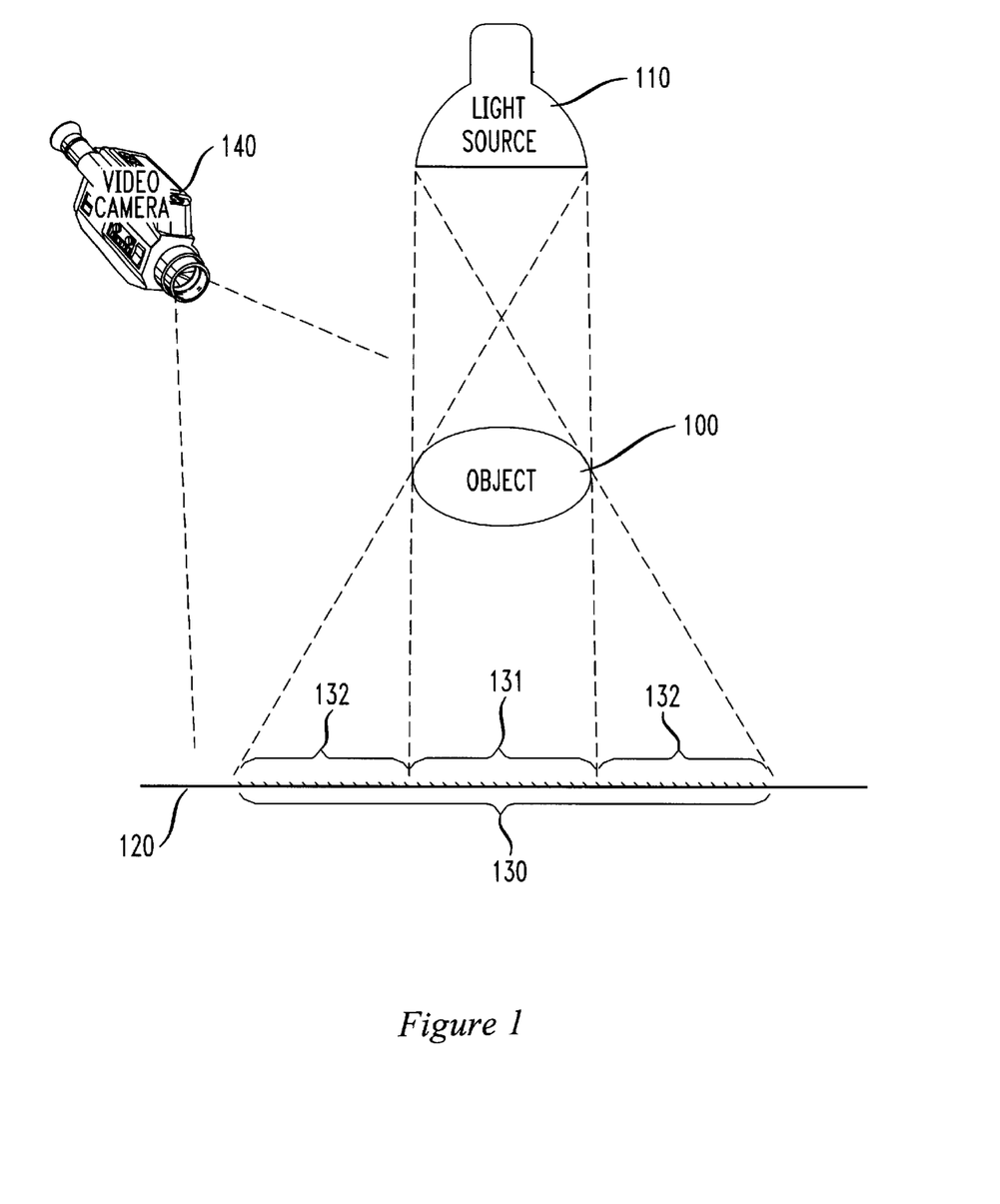
FIG. 1 shows a possible configuration for the formation of a cast shadow, according to an embodiment of the present invention.

FIG. 1 shows a possible configuration for the formation of a cast shadow, according to an embodiment of the present invention. Object 100 is illuminated by a light source 110. Cast shadow 130 is projected onto background 120. The cast shadow 130 includes shadow center 131 and shadow penumbras 132. Shadow penumbras 132 are soft transitions from dark to bright where some of the light from light source 110 reaches background 120. The appearance of cast shadow 130 can be recorded by a video camera 140.

Cast shadows 130 on background 120, including cast shadows which are moving (referred to herein as "moving cast shadows"), can be detected by the video camera 140 which collects consecutive images and by a processor (not shown) which analyzes the video images. The methods described below can be used by the processor to analyze the video images. Note that the processor need not be directly coupled to video camera 140; rather, the video images can be detected by the video camera 140 and later analyzed by the processor or the video images can be analyzed in near real time by the processor as each image is being detected by the video camera 140. In one implementation, the video images are detected by video camera 140, analyzed by the processor, and sent for transmission over a telecommunications network.

The appearance of a cast shadow in an image of a video camera 140 can be described by an image signal model. This model describes the image luminance, $S_k$, as follows:

$$S_k(x,y) = E_k(x,y) t_k(X,Y) \tag{1}$$

where, k is the time instance; x,y is the two-dimensional image position; $E_k(x,y)$ is the irradiance of the surface of object 100; and $t_k(x,y)$ is the reflectance of the surface of object 100. The irradiance $E_k(x,y)$ is the amount of light power per receiving object surface area. The irradiance $E_k(x,y)$ is a function of the direction, L, of the light source, the intensities $c_p$ and $c_a$ of light source 110 and ambient light, respectively, and the object surface normal, N, according to the following equation:

$$E_k(x, y) = \begin{cases} c_A + c_P \cos\angle(N(x, y), L) & \text{if illuminated} \\ c_A + k(x, y)c_P \cos\angle(N(x, y), L) & \text{if penumbra} \\ c_A & \text{if umbra} \end{cases} \quad (2)$$

In equation 2, the term k(x,y), which has a value between 0 and 1, describes the transition inside penumbra 132 and depends on the scene geometry. The intensity $c_p$ of the light source is proportional to $1/r^2$ with r being the distance between object 100 and light source 110.

In the image signal model of equation 1, photometric distortions of perspective projection are neglected. Note also the gamma nonlinearity (i.e., the exponential power law used to approximate the curve of output magnitude versus the input magnitude over the region of interest) of a video camera is not considered. Finally, the color of the ambient light is assumed to be the same as the color of a point light source.

The following assumptions are made: the video camera 140 and background 120 are static; background 120 is locally planar and the position of light source 110 is distant from background 120; light source 110 has an extended shape as compared to the distance of the moving object 100; and the intensity, $c_p$, of light source 110 is high. Consequently, moving cast shadows 130 on background 120 will be part of a change detection mask. A change detection mask indicates those image regions having a large frame difference between the previous and current image. In other words, the change detection mask indicates the difference in luminance on a per-pixel basis between two consecutive image frames.

To illustrate a consequence of the assumption that the intensity $c_p$ of light source 110 is high, consider a pixel at position x,y showing a part of background 120. Because the reflectance of background 120 is static and does not change, $t_k(x,y)=t_{k+1}(x,y)$ holds. When the pixel is in shadow center 131 at time k and in shadow penumbra 132 at time k+1, the difference in image luminance between frames will be large as illustrated by the following equation:

$$S_{+1}(X,Y) - S_k(X,y) = t_k(x,y) = k(x,y)C_p \cos\Delta(N(xy),L) \geq 0 \quad (3)$$

All pixels that are part of the change detection mask are evaluated by the following three criteria: (1) detection of static background edges, (2) detection of uniform changes of illumination and (3) penumbra detection. The results of these three criteria can be combined to a binary mask for regions of background 120 that are changed by moving cast shadows 130. Finally, for each image of an image sequence, moving cast shadows can be detected by temporal integration of regions changed by moving cast shadows. Each of the aspects will be discussed below.

1. Detection of Static Background Edges

To satisfy the assumption that video camera 140 and background 120 are static, a number of configurations are possible. First, any motion of video camera 140 and background 120 can be restricted. Alternatively, the previous image as $S_k$ can be motion compensated with respect to the subsequent image $S_{k+1}$.

Figure 2:
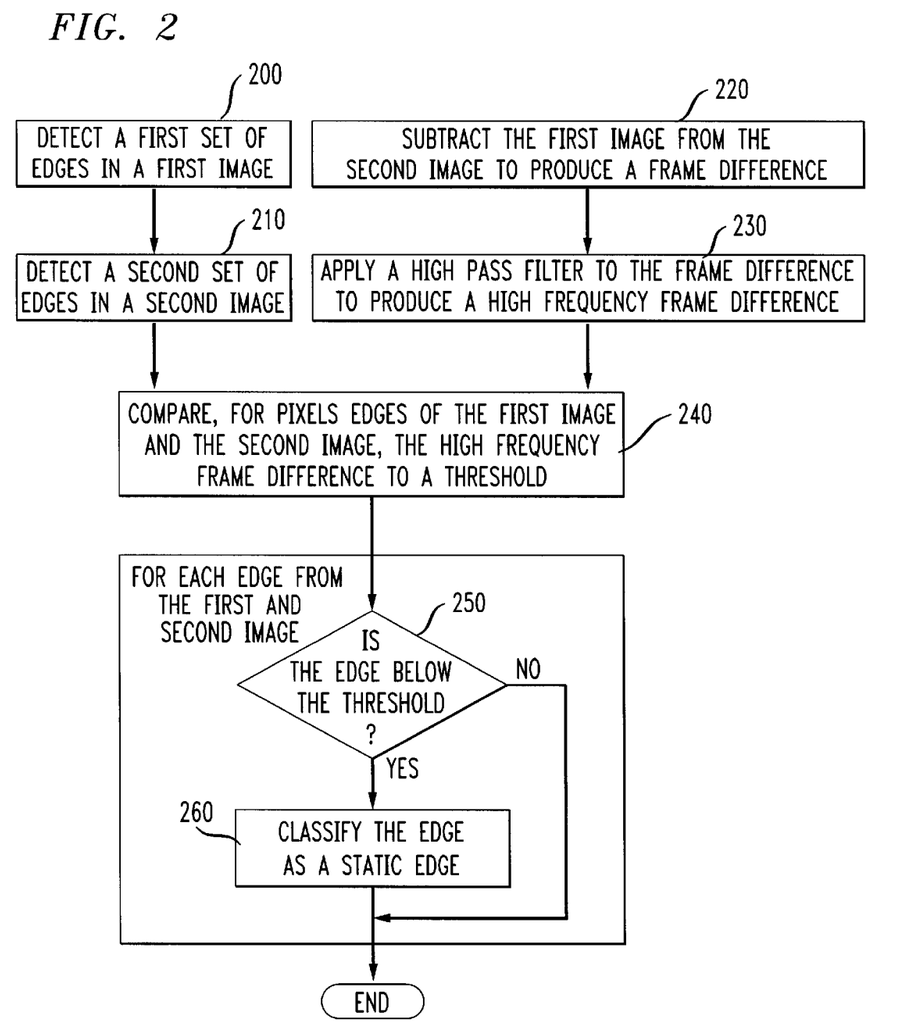
FIG. 2 illustrates a process by which static background edges can be detected, according to an embodiment of the present invention.

FIG. 2 illustrates a process by which static background edges can be detected according to an embodiment of the present invention. For example, in textured background regions inside the change detection mask, moving cast shadows 130 can be distinguished from moving objects 100 by their static background edges, because neither background 120 nor camera 140 are moving, or their motion is compensated.

At step 200, a first set of edges in a first image is detected. At step 210, a second set of edges in a second image is detected. At step 220, the first image is subtracted from the second image to produce the frame difference.

At step 230, a high-frequency filter is applied to the frame difference to produce a high frequency frame difference. At step 240, the high frequency frame difference is compared to a high-frequency threshold. The threshold for high-frequency activity can be adaptively calculated from the high frequency activities of the frame difference outside the change detection mask.

For each edge from the first and second set of edges from the first and second images, respectively, steps 250 and 260 are performed. At conditional step 250, a determination is made for each pixel of each edge whether the high frequency frame difference is below the threshold. Where high frequency frame difference is below the threshold, that edge is classified as a static edge in step 260.

The static edges can be used to detect moving cast shadows on a non-moving background inside the changed detection mask. As equation 1 illustrates, static edges in an image $s_k(x,y)$ can be rendered either to the reflectance $t(x,y)$ or to the irradiance $E_k(x,y)$. Static edges caused by discontinuities in the reflectance suggest a texture in the static background 120. Static edges caused by discontinuities in the irradiance suggest discontinuous shading at three-dimensional shape edges of a static background 120. Thus, static edges inside the change detection mask suggest the possibility of a moving cast shadow 130 on static background 120.

2. Detection of Uniform Changes of Lumination

Note the following assumptions: first, background 120 is assumed to be locally planar and light source 110 is assumed to be distant from background 120. Consequently, the irradiance as calculated by equation 2 is spatially constant because the surface normal N(x,y) is spatially constant. Further assume that the penumbra regions 132 of cash shadow 130 can be neglected.

Figure 3:
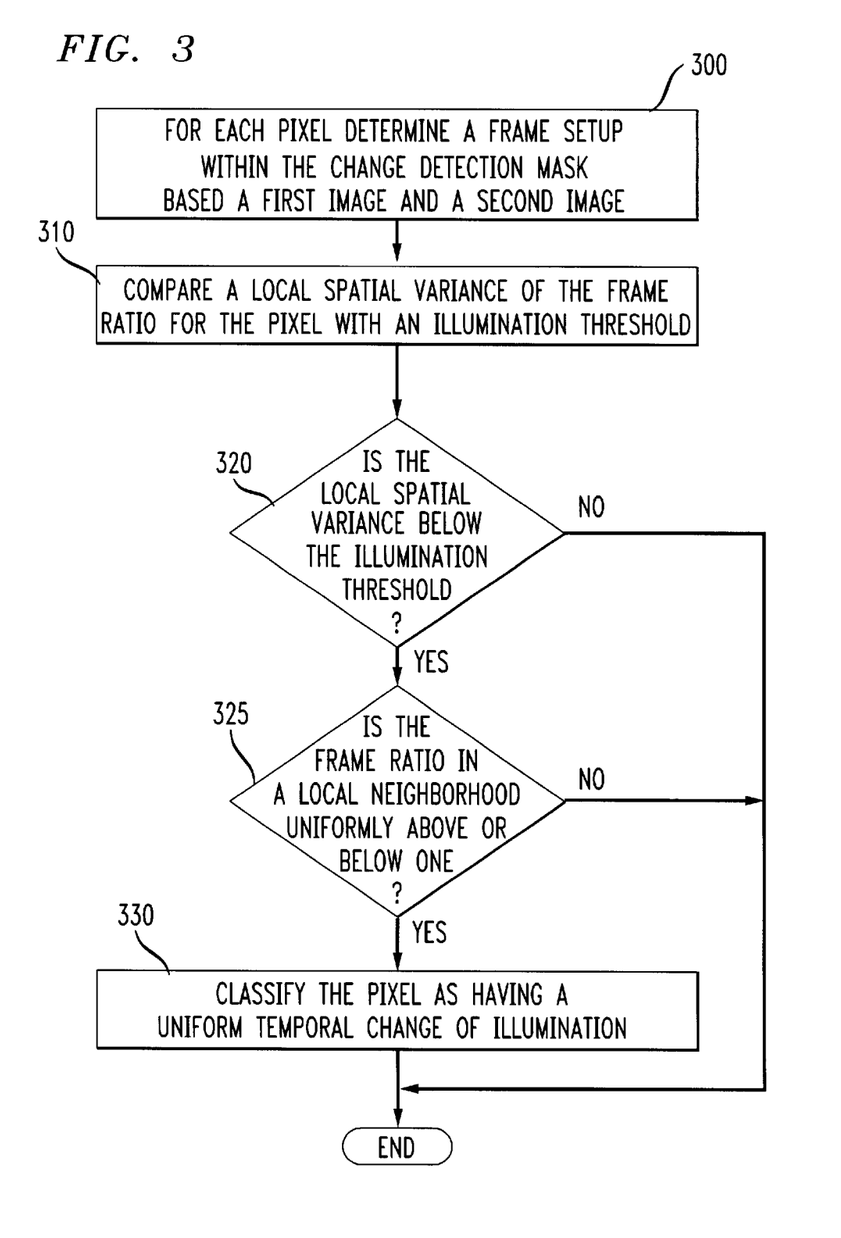
FIG. 3 illustrates a process for testing the spatial constancy of the frame ratio within an image by evaluating its local spatial variance, according to an embodiment of the present invention.

FIG. 3 illustrates a process for testing the spatial constancy of the frame ratio within an image by evaluating its local spatial variance, according to an embodiment of the present invention. Steps 300 through 330 are performed for each pixel for two consecutive frame images. At step 300, the frame ratio is determined for each pixel within the change detection mask. The frame ratio for each pixel can be calculated using the following equation:

$$FR(x, y) = \frac{s_{k+1}(x, y)}{s_k(x, y)} = \frac{E_{k+1}(x, y)}{E_k(x, y)} \frac{t_{k+1}(x, y)}{t_k(x, y)} \quad (4)$$

Because the luminance at position x, y for the pixel is assumed to be changed due to a moving cast shadow on a static background, the background reflectance can also be assumed to be unchanged and therefore $t_k(x,y)=t_{+1}(x,y)$. Thus, neglecting any camera noise, the frame ratio can be simplified to $$FR(x, y) = \frac{E_{k+1}(x, y)}{E_k(x, y)} \quad (5)$$

Consequently, where the luminance of position x, y is changed due to a moving cast shadow, the frame ratio is spatially constant in the neighborhood of x,y, because the irradiance is assumed to be constant as discussed above. Thus, if the frame ratio is locally spatially constant, a moving cast shadow can be assumed to position x, y. The frame ratio is then tested for spatial constancy by evaluating its local spatial variance.

At step 310, the local spatial variance of the frame ratio for the pixel is compared with an illumination threshold. A small variance in the local spatial variance should be allowed to address noise compensation.

At conditional step 320, the determination is made as to whether the local spatial variance is below the illumination threshold. If the local spatial variance is below the illumination threshold, then the process proceeds to conditional step 325. At conditional step 325, a determination is made as to whether the frame ratio in a local neighborhood (e.g., a 3×3 pixel area around the pixel being considered) is uniformly above or below one. If this condition is satisfied, then the process proceeds to step 330. At step 330, the pixel is classified as having a uniform temporal change of illumination. The occurrence of a pixel having a uniform temporal change of illumination suggests the presence of a moving cast shadow at that pixel location.

The illumination threshold can be adaptively calculated from the local variances of the frame ratio outside the change detection mask.

Note the process described in FIG. 3 erroneously can detect a moving cast shadow if at position x, y a uniformly colored moving object that rotates is visible. In this case, the simplification from equation 4 to equation 5 would still hold true and the frame ratio will still be locally, spatially constant although a moving cast shadow would not exist at this particular pixel location.

3. Penumbra Detection

Because the extent of light source 110 is assumed to be not negligible compared to the distance between light source 110 and moving object 100, cast shadow 130 has penumbra regions 132. The moving cast shadow 130 can be detected by the existence and characteristics of penumbras 132.

Figure 5:
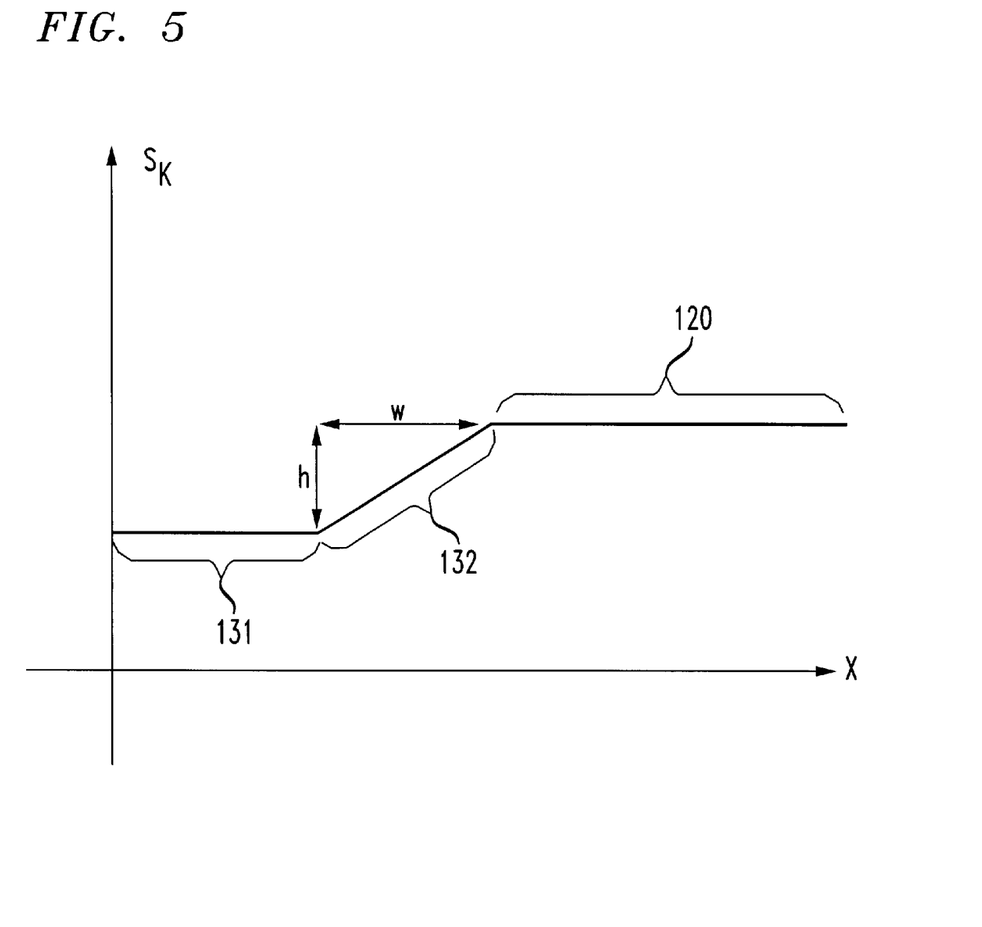
FIG. 5 illustrates a luminance step model for a luminance step in an image perpendicular to a shadow contour, according to an embodiment of the present invention.

The penumbra 132 of cast shadow 130 causes a soft luminance step at the contour of a shadow 130. The luminance step in an image perpendicular to a shadow contour can be modeled by a luminance step model as illustrated in FIG. 5, according to an embodiment of the present invention. In this luminance step model, the luminance is assumed to rise linearly across shadow penumbra 132 from a low luminance inside a shadow (i.e., center shadow 131) to a high luminance outside the shadow (i.e., background 120). The luminance step within penumbra 132 can be characterized by its step height h, step width w and its gradient g which equals h/w If the width of a luminance step caused by a penumbra 132 is much larger than that of edges caused by the aperture of video camera 140 for surface texture edges of object 100 or edges of object 100, then the luminance step can be used for shadow detection.

Table 1 characterizes the luminance step height, gradient, and width of different kinds of edges in an image. As Table 1 shows, shadow edges can be distinguished from other edges by their luminance step width. The luminance step height alone is not an appropriate criterion by which shadow edges can be distinguished because either a shadow edge caused by a bright light source 100 or a texture edge with much contrast may cause a high luminance step. The luminance step gradient alone also is not an appropriate criterion by which shadow edges can be distinguished either because the gradient of a shadow edge caused by a bright light source 100 (with a certain extent) may be comparable to that of a texture edge with less contrast (and a small aperture for video camera 140).

TABLE 1

| Edge Type | Height | Gradient | Width |
|---|---|---|---|
| shadow contour, bright light source | large | medium | large |
| shadow contour, weak light source | small | small | large |
| texture/object edge, much contrast | large | large | small |
| texture/object edge, less contrast | small | medium | small |

Figure 4:
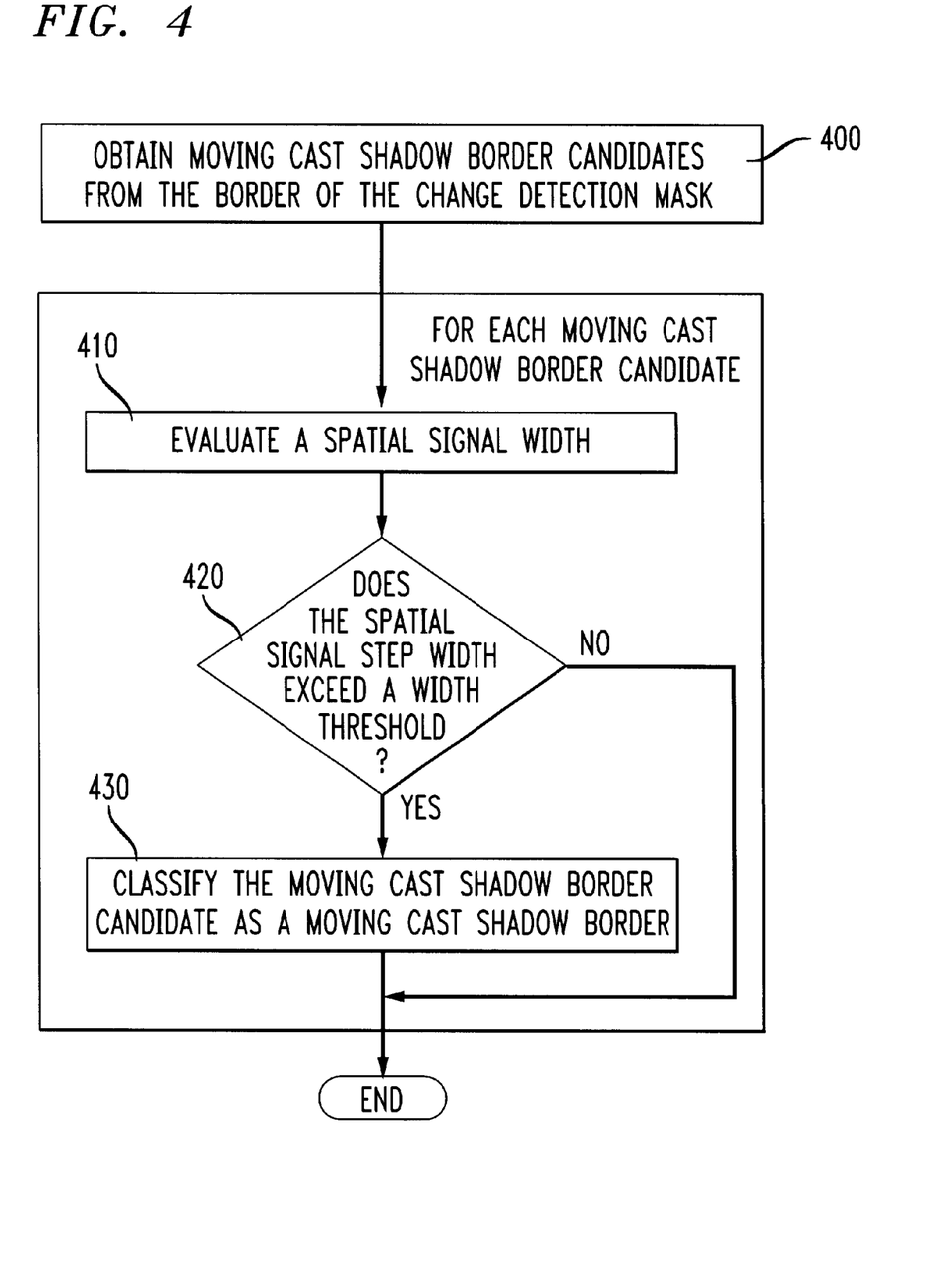
FIG. 4 illustrates a process by which penumbras can be detected, according to an embodiment of the present invention.

FIG. 4 illustrates a process by which penumbras can be detected, according to an embodiment of the present invention. At step 400, moving cast shadow border candidates are obtained from the border of the change detection mask. The moving cast shadow border candidate can belong to edges of object 100 or a shadow contour, because the change detection mask contains image regions changed by moving objects 100 or moving cast shadows 130.

The number of moving cast shadow border candidates is low compared to the number of edges indicated by known edge detection algorithms. Moreover, known edge detection algorithms have difficulties in finding soft shadow contours. Additionally, the number of moving cast shadow border candidates is further reduced because the object mask of the first image, if available, is or-connected to the change detection mask to fill holes inside the change detection mask. Also, to enhance the precision, the moving cast shadow border candidates are moved perpendicular to the border of the change detection mask to a position of highest luminance gradient. The gradient is measured perpendicular to the border of the change detection mask using a Sobel operator. The Sobel operator consists of two finite-duration impulse response (FIR) filters with the filter $$\text{kernels: } \begin{matrix} -1 & 0 & 1 \\ -2 & 0 & 2 \\ -1 & 0 & 1 \end{matrix} \text{ and } \begin{matrix} -1 & -2 & -1 \\ 0 & 0 & 0 \\ 1 & 2 & 1 \end{matrix}$$

Steps 410, 420 and 430 are performed for each moving cast shadow border candidate. At step 410, a spatial signal step width of the frame difference is evaluated. At conditional step 420, the spatial signal step width is compared to a width threshold. If the spatial signal step width exceeds the width threshold, then the moving cast shadow border candidate is classified as a moving cast shadow border in step 430.

To determine the spatial signal step width for each moving cast shadow border candidate, the height and gradient of the signal steps perpendicular to the edge are measured for each moving cast shadow border candidate. The signal step height and gradient are measured in the frame difference between two consecutive images because whether the relevant edges are in the previous or in the current image depends on the unknown motion of cast shadows and objects. The signal step height can be measured by the difference of the average frame differences from both sides of the edge. For example, a 3 pixel by 3 pixel averaging window (for example, for the common intermediate format (CIF) image format) can be placed beside the edge. The signal gradient can be measured using a Sobel operator aligned perpendicular to the edge. The direction of the edge can be measured by a regression line evaluating moving cast shadow border candidates in a neighborhood of a 7 pixel by 7 pixel area.

The spatial signal step width, w, equals the height, h, divided by the gradient, g. The width threshold can be selected for the particular system as appropriate. For example, the width threshold can equal 2.4 pixels for a standard video camera. The width threshold can be lower for high definition television (HDTV) or higher for low light level video systems.

4. Detection of Image Regions Changed by Moving Cast Shadows

Figure 6:
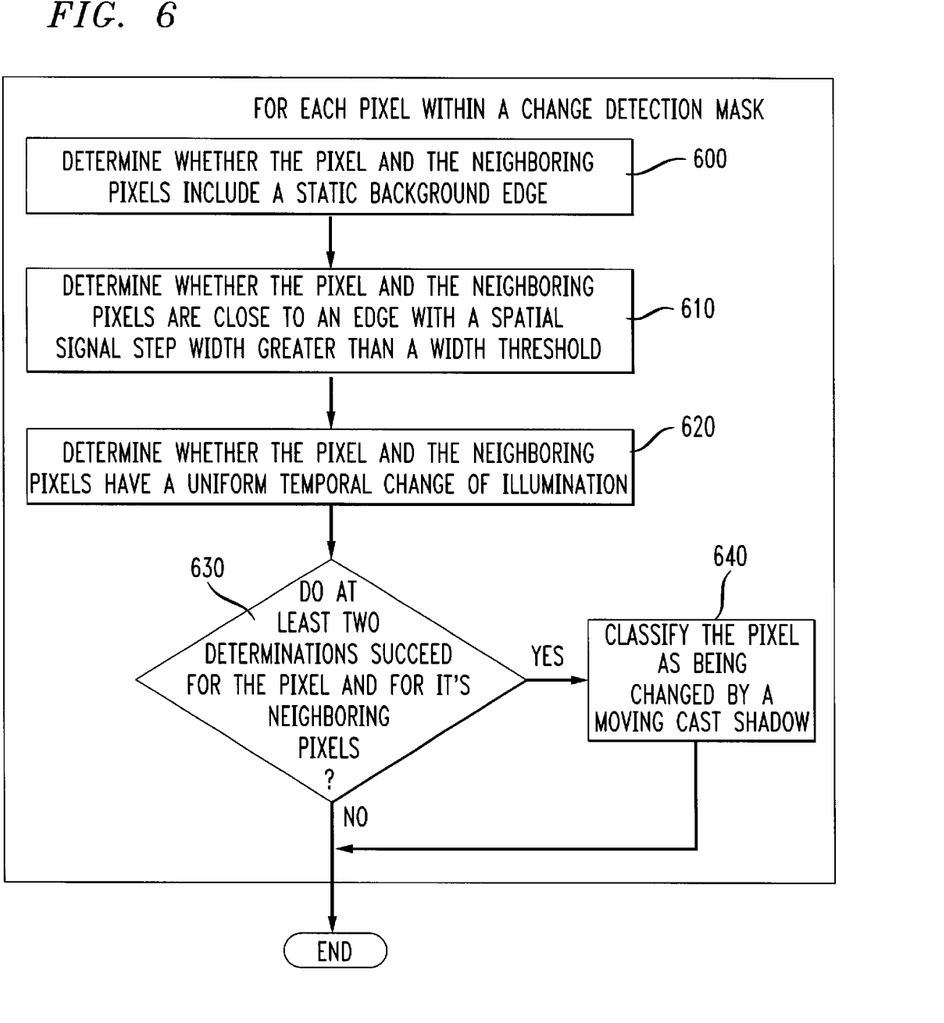
FIG. 6 illustrates the application of heuristic rules to determine image regions changed by a moving cast shadow, according to an embodiment of the present invention.

To detect image regions changed by moving cast shadows, the results of the three criteria from sections 1, 2 and 3 can be evaluated by heuristic rules. For each pixel of the change detection mask, a determination must be made whether the changes are caused by a moving cast shadow or by some other phenomena. Table 2 summarizes some of the heuristic evaluation rules to determine whether or not the pixel has been changed by a moving cast shadow. As the table illustrates, the first column considers whether a change was detected. The second column evaluates the result of edge classification from section 1. The third column indicates the result of illumination change classification from section 2 and the fourth column indicates the decision as to whether the pixel has been changed by a moving cast shadow. Additionally, the penumbra criteria from section 3 is evaluated in a local neighborhood of each pixel. If too many object edges are observed, the shadow hypothesis from Table 2, i.e, column 4, is rejected.

spatial signal step width greater than a width threshold. The determination of step 610 can be made according to the process described in section 2 above.

At step 620, a determination is made as to whether the pixel and the neighboring pixels have a uniform temporal change of illumination. The determination made in step 620 can be performed according to the process described in section 3 above.

Steps 630 through 650 classify pixels as being changed by moving cast shadows according to the heuristic rules discussed in Table 2 and Section 3. At conditional step 630, the determinations made in step 600, 610 and 620 are evaluated with respect to the pixel and its neighboring pixels. If, however, at least two determinations for the pixel and its neighboring pixels do not succeed, then the process ends for that pixel. If at least two determinations succeed for the pixel and its neighboring pixel, then the process proceeds to step 650. At step 650, the pixel is classified as being changed by a moving cast shadow.

5. Segmentation of Moving Objects Considering Moving Shadows

Figure 7:
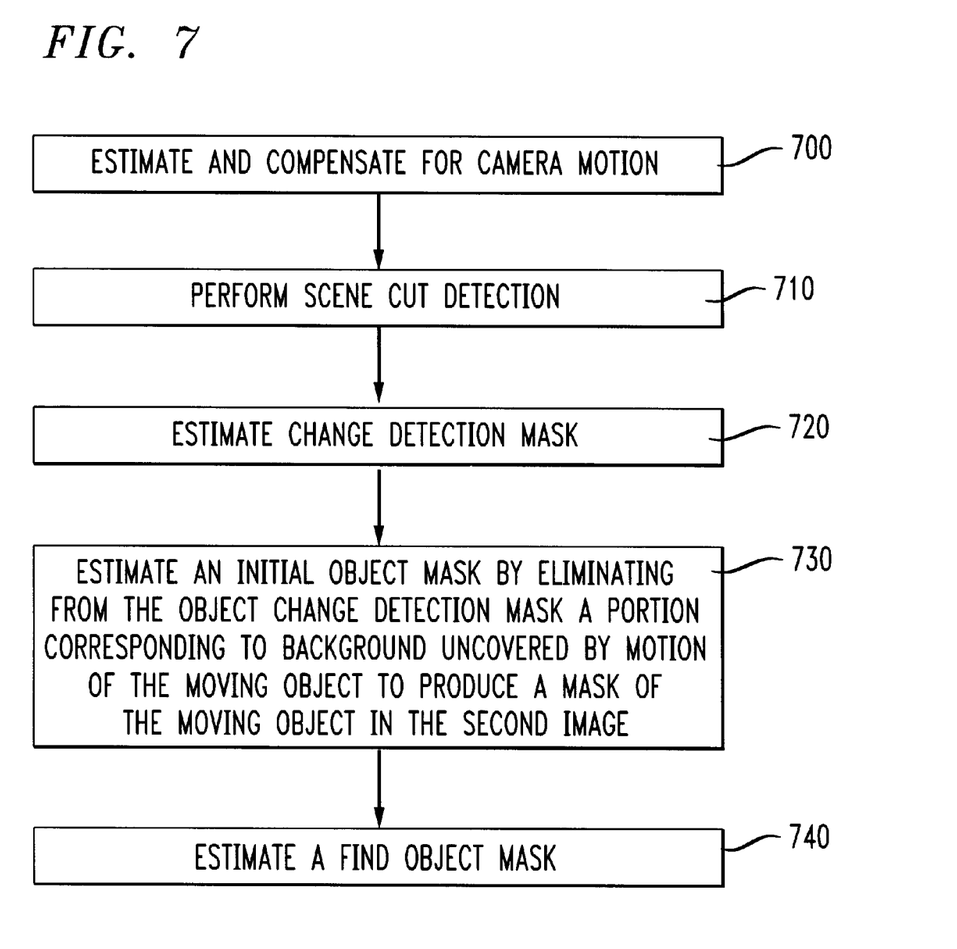
FIGS. 7 and 8 illustrate a process by which two-dimensional shape estimation of moving objects in an image sequence can be applied to image regions changed by moving cast shadows, according to an embodiment of the present invention.
Figure 8:
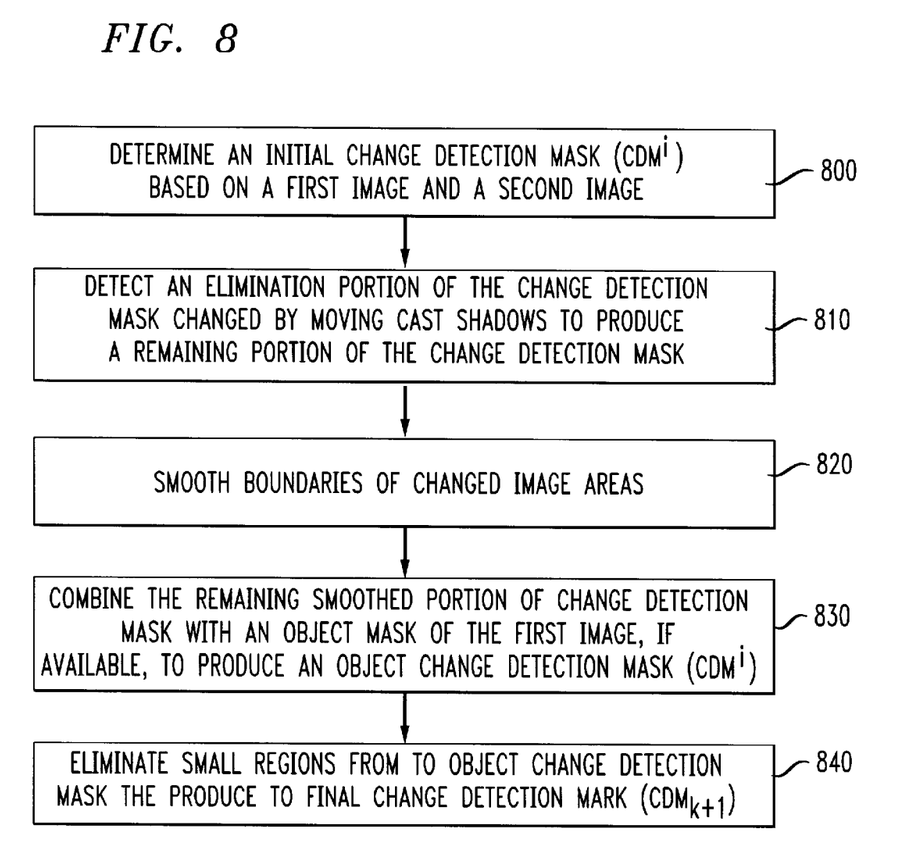

FIGS. 7 and 8 illustrate a process by which a two-dimensional shape estimation of moving objects in an image sequence can be applied to image sequences containing both

TABLE 2

| Row # | Results of change detection | Results of edge classification (see section 1) | Result of illumination change classification (see section 2) | Decision: Pixel has changed by a moving cast shadow |
|---|---|---|---|---|
| 0 | unchanged | no edge | no result | NO |
| 1 | unchanged | no edge | uniform | NO |
| 2 | unchanged | no edge | non-uniform | NO |
| 3 | unchanged | static edge | no result | NO |
| 4 | unchanged | static edge | uniform | NO |
| 5 | unchanged | static edge | non-uniform | NO |
| 6 | unchanged | moving edge | no result | NO |
| 7 | unchanged | moving edge | uniform | if any neighboring pixel satisfies row 13 then YES; else NO |
| 8 | unchanged | moving edge | non-uniform | |
| 9 | changed | no edge | no result | NO |
| 10 | changed | no edge | uniform | YES |
| 11 | changed | no edge | non-uniform | if any neighboring pixel satisfies row 10 but not row 15, or rows 0–6 but not rows 12 and 17 then YES; else NO |
| 12 | changed | static edge | no result | if any neighboring pixel satisfies row 13 but not 11 and 17 then YES; else NO |
| 13 | changed | static edge | uniform | YES |
| 14 | changed | static edge | non-uniform | YES |
| 15 | changed | moving edge | no result | NO |
| 16 | changed | moving edge | uniform | if any neighboring pixel satisfies row 13 then YES; else NO |
| 17 | changed | moving edge | non-uniform | NO |

FIG. 6 illustrates the application of heuristic rules to determine image regions changed by a moving cast shadow, according to an embodiment of the present invention. Steps 600 through 650 are repeated for each pixel within the change detection mask.

At step 600, a determination is made as to whether the pixel and the neighboring pixels include a static background edge. The determination performed in step 600 is made in accordance with the process described in section 1 above.

At step 610, a determination is made as to whether the pixel and the neighboring pixels are close to an edge with a moving objects and moving cast shadows according to an embodiment of the present invention. At step 700, the apparent motion of video camera 140 or background 120 can be estimated and compensated to reflect any kind of global motion, e.g., caused by zoom and pan of the camera 140. At step 710, scene cut detection is performed by evaluating whether the mean square error between a current original frame $S_{k+1}$ and a camera motion compensated from the previous frame $S_{k, CMC}$ exceeds a given threshold. If the threshold is exceeded, then all parameters are reset to their initial values. The scene cut detection performed in step 710 is only performed in the background regions of the previous frame which are taken from the previous object mask ($OM_k$). In that mask, all pixels are set to foreground which belong to a moving object in the previous frame.

At step 720, a change detection mask between two successive frames is estimated. This step 720 is described in further detail with reference to FIG. 8 and will be discussed below.

At step 730, an initial object mask $OM^i$ is calculated by eliminating the uncovered background areas from the final change detection mask $CDM_{k+1}$. Therefore, displacement information for pixels within the changed regions is used. The displacement is estimated by a hierarchical block-matcher (HBM). See M. Bierling, "Displacement estimation by hierarchical block matching", 3rd *SPIE Symposium on Visual Communications and Image Processing*, Cambridge, U.S.A., pp. 941-51, Nov. 1988, which is incorporated herein by reference for background. For a higher accuracy of the calculated displacement vector field, the change detection mask from the first step is considered by the HBM. Uncovered background is detected by pixels with foot- or top-point of the corresponding displacement vector being outside the changed area in the final change detection mask, $CDM_{k+1}$.

At step 740, the final object mask is estimated. In other words, the boundaries of the initial object mask, $OM^i$ are adapted to luminance edges in the current image to improve the accuracy. The final result is the final object mask $OM_{k+1}$.

FIG. 8 describes the process by which the change detection mask is estimated in step 720 of FIG. 7, according to an embodiment of the present invention. At step 800, an initial change detection mask, $CDM^i$, is determined based on a first image and a second image. In other words, an initial change detection mask, $CDM^i$, between the two successive frames is generated by thresholding the frame difference using a global threshold. In this initial change detection mask, pixels with image luminance change due to a moving object are labeled as changed, others are labeled as unchanged.

At step 810, a shadow portion of the change detection mask changed by the moving cast shadow is detected to produce a remaining portion of the change detection mask. The process of detecting the shadow portion of a change detection mask which is changed by the moving cast shadow can be done according to the processes described above with reference to sections 1, 2 and 3.

At step 820, boundaries of the changed image areas within the remaining portion of the change detection mask are smoothed. These boundaries can be smoothed, for example, by a relaxation technique using locally adapted thresholds. Consequently, the process adapts framewise automatically to noise from video camera 140.

At step 830, the smoothed remaining portion of the change detection mask is combined with an object mask from a first image, if available, to produce an object change detection mask. This step allows the production of temporally stable object regions. More specifically, the object change detection mask contains all pixels from the remaining portion of a change detection mask which are labeled as changed, and additionally, all pixels which belong to the object mask of the previous frame. This is based on the assumption that all pixels which belong to the previous object mask should belong to the current object change detection mask. Moreover, to avoid infinite error propagation, a pixel from the previous object mask is only labeled as changed in the object change detection mask if it was also labeled as changed in the remaining portion of the change detection mask of one of the last N frames. The value N corresponds to the time period which this particular pixel has been identified as being changed. The value N adapts automatically to the sequence by evaluating the size and motion amplitudes of the moving objects in the previous frame.

At step 840, small regions from the object change detection mask are eliminated resolving in the final change detection mask $CDM_{k+1}$.

It should, of course, be understood that while the present invention has been described in reference to a particular system configuration and process, other systems and processes should be apparent to those of ordinary skill in the art. For example, althought the present invention was described in reference to an example of an arrangement of the object, light source, background and video camera, other arrangements are possible.

What is claimed is:

1. A method for detecting a static background edge within a first image, comprising:
   (a) detecting a first plurality of edges in the first image;
   (b) detecting a second plurality of edges in a second image;
   (c) subtracting the first image from the second image to produce a frame difference;
   (d) applying a high frequency filter to the frame difference to produce a high frequency frame difference;
   (e) comparing the high frequency frame difference to a threshold; and
   (f) classifying, for each pixel from the first plurality of edges and from the second plurality of edges, a static edge when the edge from the high frequency frame difference is below the threshold.

2. The method of claim 1, wherein the threshold is adaptively calculated based on the high frequency frame difference.

3. A method for detecting a uniform temporal change of illumination in a pixel between a first image and a second image, comprising:
   (a) determining a frame ratio within a change detection mask based on a first image and a second image, the change detection mask corresponding to a plurality of image regions of large difference between the first image and the second image;
   (b) comparing a local spatial variance of the frame ratio for each pixel with an illumination threshold; and
   (c) classifying each pixel as having a uniform temporal change of illumination when the local spatial variance is below the illumination threshold for that pixel.

4. The method of claim 3, wherein said classifying step (c) is performed only when the frame ratio for a subset of pixels neighboring the pixel have a frame ratio uniformly greater than or less than one.

5. A method for detecting borders of a moving cast shadow within a change detection mask having a border, the change detection mask corresponding to a difference between a first image and a second image, comprising:
   (a) obtaining a plurality of moving cast shadow border candidates from the border of the change detection mask;
   (b) performing, for each moving cast shadow border candidate from the plurality of moving cast shadow border candidates, the following substeps:
      (i) evaluating a spatial signal step width; and
      (ii) classifying the moving cast shadow border candidate as a moving cast shadow border when the moving cast shadow border candidate has a spatial signal step width exceeding a width threshold.

6. The method of claim 5, wherein the spatial signal step width evaluated in said evaluating step (b)(i) corresponds to the frame difference between the first image and the second image.

7. The method of claim 5, wherein the width threshold is related to an aperture of a camera providing the first image and the second image.

8. The method of claim 5, wherein the spatial signal step width evaluated in said evaluating step (b) for each moving cast shadow border candidate is determined along a line perpendicular to the moving cast shadow border candidate, the perpendicular line being determined by linear regression of a plurality of positions of neighboring moving cast shadow border candidates.

9. The method of claim 5, wherein the spatial signal step width evaluated in said evaluating step (b) for each moving cast shadow border candidate corresponds to a spatial signal step height divided by a spatial signal step gradient.

10. The method of claim 5, wherein the plurality of moving cast shadow candidates obtained in said obtaining step (a) includes the substep of:
(i) relocating at least one moving cast shadow candidate from the plurality of moving cast shadow candidates, the moving cast shadow candidate being relocated perpendicular to a border of the change detection mask to a position of highest spatial gradient of the difference between the first image and the second image.

11. A method for detecting an image region changed by a moving cast shadow from a first image to a second image, comprising:
(a) performing, for each pixel within a change detection mask, the change detection mask corresponding to a difference between the first image and the second image, the following substeps:
(i) determining whether the pixel and a plurality of neighboring pixels include a static background edge;
(ii) determining whether the pixel and the plurality of neighboring pixels are close to an edge with a spatial signal step width greater than a threshold, the signal step width being the difference between the first image and the second image;
(iii) determining whether the pixel and the plurality of neighboring pixels have a uniform temporal change of illumination; and
(iv) classifying the pixel as being changed by a moving cast shadow when at least two determinations from the group of determinations in steps (a)(i), (a)(ii) and (a)(iii) succeed for the pixel and the plurality of neighboring pixels.

12. The method of claim 11, wherein said determining substep (a)(i) further includes the following substeps:
(1) detecting a first plurality of edges in the first image;
(2) detecting a second plurality of edges in a second image;
(3) subtracting the first image from the second image to produce a frame difference;
(4) applying a high frequency filter to the frame difference to produce a high frequency frame difference;
(5) comparing the high frequency frame difference to a threshold; and
(6) classifying, for each pixel from the first plurality of edges and from the second plurality of edges, a static edge when the edge from the high frequency frame difference is below the threshold.

13. The method of claim 11, wherein said determining substep (a)(ii) further includes the following substeps:

(1) obtaining a plurality of moving cast shadow border candidates from the border of the change detection mask;
(2) performing, for each moving cast shadow border candidate from the plurality of moving cast shadow border candidates, the following substeps:
(A) evaluating a spatial signal step width; and
(B) classifying the moving cast shadow border candidate as a moving cast shadow border when the moving cast shadow border candidate has the spatial signal step width exceeding a width threshold.

14. The method of claim 11, wherein said determining step (a)(iii) further includes the following substeps:
(1) determining a frame ratio within the change detection mask based on a first image and a second image, the change detection mask corresponding to a difference between a first image and a second image;
(2) comparing a local spatial variance of the frame ratio for the pixel with an illumination threshold; and
(3) classifying the pixel as having a uniform temporal change of illumination when the local spatial variance is below the illumination threshold for the pixel.

15. A method for segmenting a moving object in front of a rigid background having a moving cast shadow, comprising:
(a) determining a change detection mask based on a first image and a second image;
(b) detecting an elimination portion of the change detection mask changed by the moving cast shadow to produce a remaining portion of the change detection mask;
(c) combining the remaining portion of the change detection mask with an object mask of the first image, if available, to produce an object change detection mask; and
(d) eliminating from the object change detection mask a portion corresponding to background uncovered by motion of the moving object to produce a mask of the moving object in the second image.

16. The method of claim 15, wherein said detecting step (b) further includes, for each pixel within a change detection mask and a plurality of neighboring pixels, the following substeps:
(i) determining whether the pixel and the plurality of neighboring pixels include a static background edge;
(ii) determining whether the pixel and the plurality of neighboring pixels are close to an edge with a spatial signal step width exceeding a threshold, the signal step width being the difference between the first image and the second image;
(iii) determining whether the pixel and the plurality of neighboring pixels has a uniform temporal change of illumination; and
(iv) classifying the pixel as being changed by a moving cast shadow when at least two determinations from the group of determinations in steps (b)(i), (b)(ii) and (b)(iii) succeed for the pixel and for the plurality of neighboring pixels.

17. The method of claim 15, wherein said eliminating step (d) further includes the substep of:
(i) detecting the background uncovered by motion of the moving object within the change detection mask.

18. A method for detecting uncovered background within a change detection mask, the change detection mask corresponding to a large difference between a first image and a second image, comprising:

(a) estimating a displacement vector field having one vector for each pixel of the second image, the vector for each pixel of the second image pointing from a corresponding image position of the first image to the pixel of the second image; and (b) categorizing a portion of the change detection mask as uncovered background where pixels of the second image have a vector from the displacement vector field with an origin outside the change detection mask.

19. A method for segmenting and temporally tracking a plurality of moving cast shadows on a static background for a plurality of sequential image pairs, each image pair having a first image and a second image, comprising:

(a) setting each pixel of a mask to a first value, the first value indicating no moving cast shadow;

(b) performing, for each image pair from the plurality of sequential image pairs, the following substeps:

(1) detecting a plurality of image regions changed by the moving cast shadows;

(2) calculating a frame ratio by dividing each pixel of the second image by the corresponding pixel in the first image;

(3) classifying each image region detected in said detecting step (1) into:

(i) a first portion when the image region has a frame ratio greater than or equal to one, and (ii) a second portion when the image region has a frame ratio smaller than one;

(4) setting to the first value in the mask each image region classified as the first portion in said classifying step (b)(1); and (5) setting to a second value in the mask each image region classified as the second portion in said classifying step (b)(2).

20. The method of claim 19, wherein said performing step (b) further comprises the substep of:

(6) eliminating small regions having the first value and small regions having the second value in the mask.

\* \* \* \* \*